United States Patent [19]

Hostetler

[11] Patent Number: 5,178,079
[45] Date of Patent: Jan. 12, 1993

[54] EXTRUDED PIPE WATERING SYSTEM

[75] Inventor: Eldon Hostetler, Middlebury, Ind.

[73] Assignee: Ziggity Systems, Inc., Middlebury, Ind.

[21] Appl. No.: 823,886

[22] Filed: Jan. 22, 1992

[51] Int. Cl.⁵ .............................................. A01K 7/00
[52] U.S. Cl. .......................................... 119/72; 248/58
[58] Field of Search ......................... 119/72, 72.5, 75; 248/68.1, 59, 62; 285/197

[56] References Cited

U.S. PATENT DOCUMENTS

| | | |
|---|---|---|
| 29,276 | 7/1860 | Holmes . |
| 2,574,309 | 11/1951 | Wood ..................... 248/58 |
| 3,004,330 | 10/1961 | Wilkins . |
| 3,069,189 | 12/1962 | Hollaender . |
| 3,110,754 | 11/1963 | Witort et al. . |
| 3,187,936 | 6/1965 | Downing . |
| 3,418,977 | 6/1966 | Godshalk . |
| 3,582,006 | 6/1971 | Thompson ............... 251/146 |
| 3,602,197 | 8/1971 | Fioretto ................. 119/72.5 |
| 3,907,002 | 9/1975 | Gülich .................... 138/115 |
| 3,941,157 | 3/1976 | Barnett .................. 138/115 |
| 4,086,937 | 5/1978 | Hechler, IV ............ 137/559 |
| 4,092,997 | 6/1978 | Hansen .................. 137/351 |
| 4,221,188 | 9/1980 | Hostetler ................ 119/72 |
| 4,240,602 | 12/1980 | McDonald .............. 248/58 |
| 4,269,357 | 5/1981 | Menzel et al. .......... 239/272 |
| 4,273,070 | 6/1981 | Hoefelmayr ............ 119/14.51 |
| 4,491,088 | 1/1985 | Hostetler .............. 119/72.5 |
| 4,516,533 | 5/1985 | Mallinson .............. 119/72 |
| 4,527,513 | 7/1985 | Hart et al. ............. 119/51.5 |
| 4,600,146 | 7/1986 | Ohno ..................... 239/6 |
| 4,669,422 | 6/1987 | Steudler, Jr. ........... 119/72 |
| 4,753,196 | 6/1988 | Lack et al. ............. 119/75 |
| 4,790,264 | 12/1988 | Lack et al. ............. 119/72.5 |
| 4,852,522 | 8/1989 | Uri ....................... 119/72 |
| 4,884,528 | 12/1989 | Steudler, Jr. .......... 119/72.5 |
| 4,982,699 | 1/1991 | Momont ................. 119/72.5 |
| 5,036,891 | 8/1991 | Vogelsang .............. 138/115 |
| 5,097,798 | 3/1992 | Little .................... 119/72.5 X |

FOREIGN PATENT DOCUMENTS 924973  4/1973  Canada .................. 119/48

Primary Examiner—Gene Mancene
Assistant Examiner—Thomas Price
Attorney, Agent, or Firm—Barnes & Thornburg

[57] ABSTRACT

A poultry watering system is provided having a support conduit integrally formed within a flange extending from and integrally formed with a fluid conduit. That flange further includes a snap-fit connection to a hanger bracket which also mounts a two wire anti-roosting device. The fluid conduit also includes saddle flanges retained via snap-fit which shield the saddles and associated drinker devices from run off. When so retained, the saddles penetrate the fluid conduit and permit fluid flow to the drinker devices. The fluid conduit, its flanges and the support conduit can be extruded as a unitary element from PVC plastic materials while other materials can be employed for the saddle and drinker devices to minimize costs without loss of system effectiveness in performance.

13 Claims, 4 Drawing Sheets

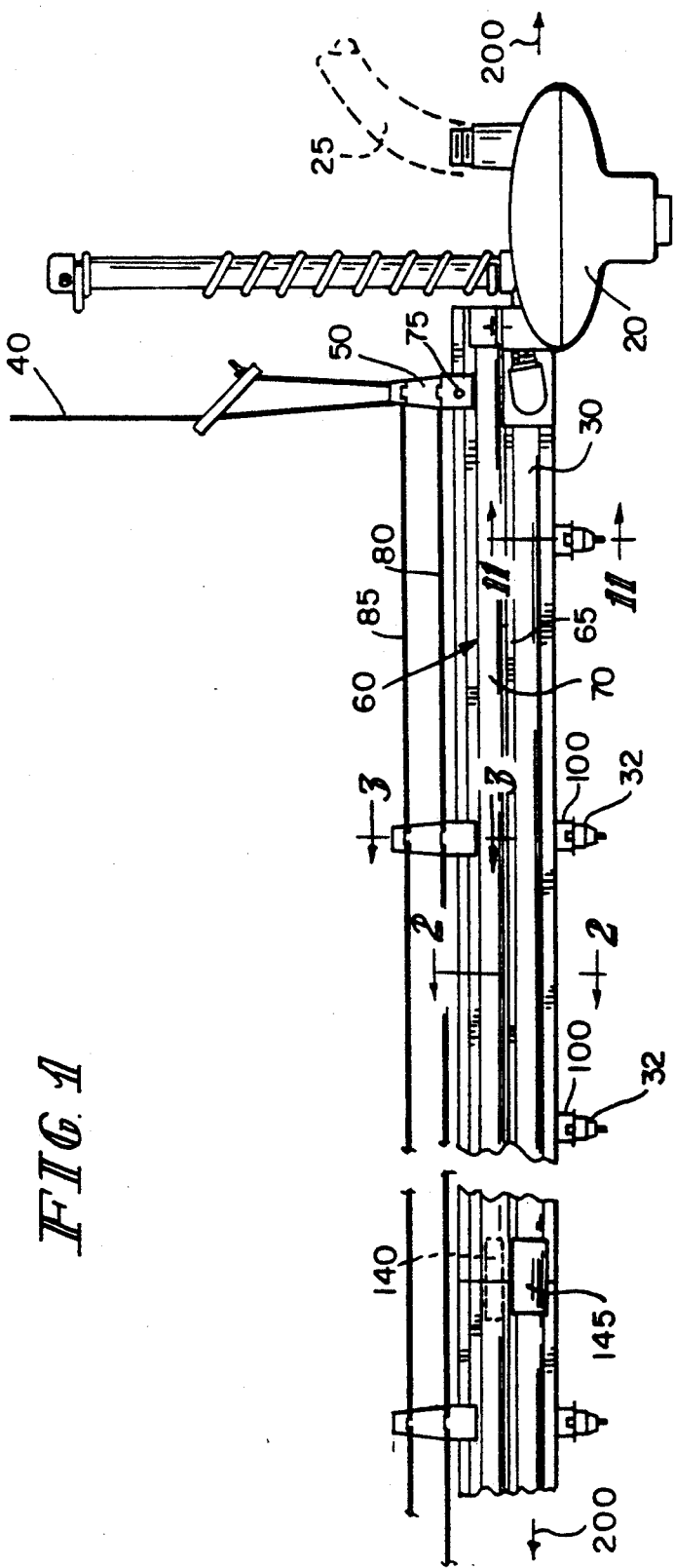

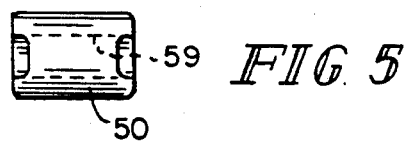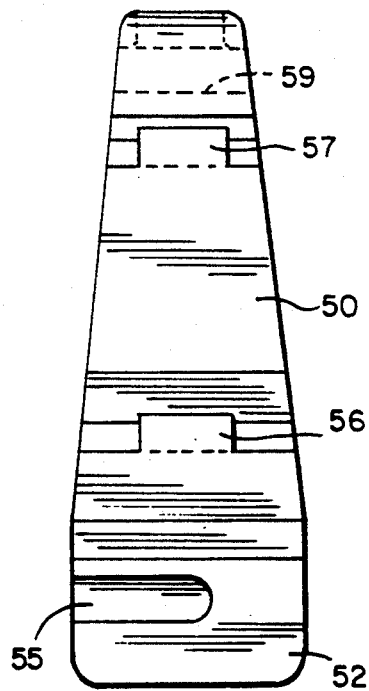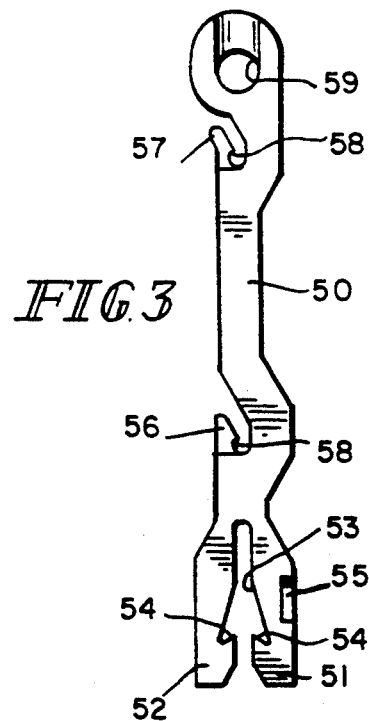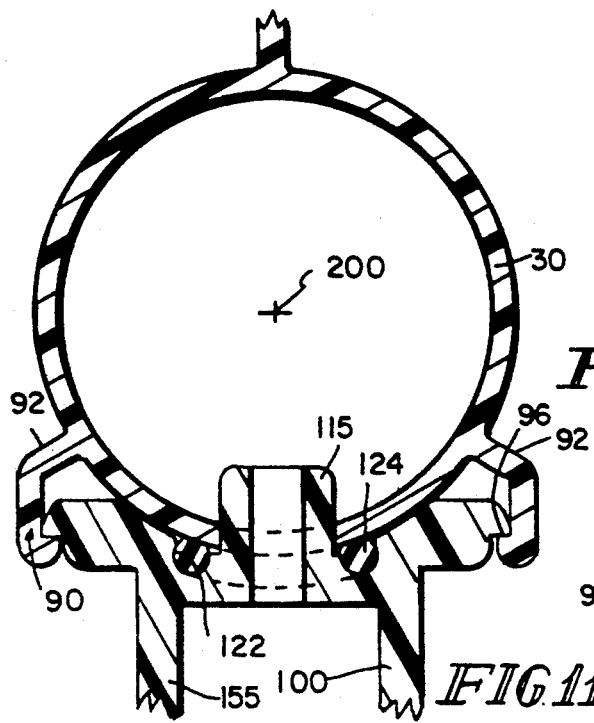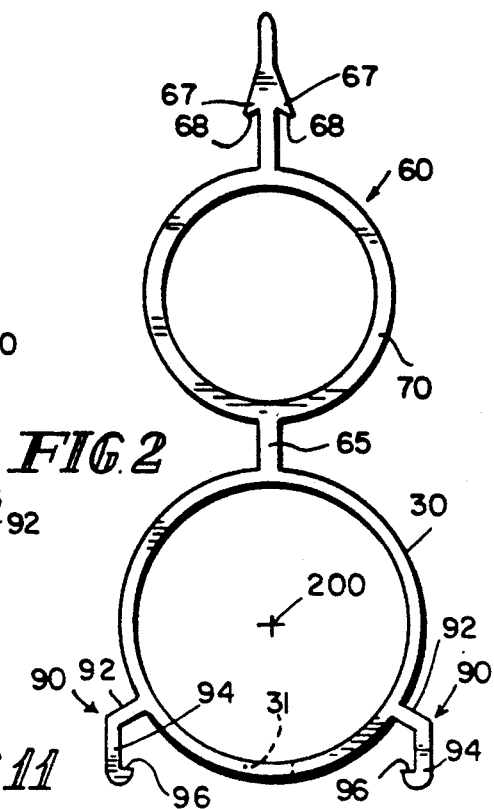

EXTRUDED PIPE WATERING SYSTEM

BACKGROUND AND SUMMARY OF THE INVENTION

The present invention relates generally to watering systems for poultry and small animals. More particularly, this invention relates to systems for watering poultry retained in an enclosure having a floor and a space above that floor wherein the watering system can be elevated.

Numerous poultry watering systems are now known. Most of these systems include one or more fluid conduits which extend longitudinally in suspension above the floor of a poultry house, such as the watering systems shown in U.S. Pat. Nos. 4,221,188 and 4,491,088. Watering or drinker devices, such as nipple drinkers or cups, are typically connected to the fluid conduits and are directly actuated by the poultry. However, it has been found to generally be more economical to include with such watering systems a separate support pipe connected above the fluid conduit, such as in the arrangement shown in U.S. Pat. Nos. 4,669,422 and 4,753,196. With a separate support pipe, the thickness (and corresponding cost) of the fluid conduit can be significantly reduced without significant loss of rigidity against bending.

Such support pipes are generally commonly available galvanized steel pipe. Since that steel pipe typically extends for the same length as the fluid conduit, the overall watering system has substantial weight. When the watering system is elevated above the poultry house floor during use and for cleaning between the time each flock of birds is raised, the suspension and elevation systems must be constructed so as to securely support this weight. Further, secure connection brackets must be employed to join the support pipe and the fluid conduit. Such connection brackets often are subject to two failings: they are difficult to clean and they do not grip the fluid conduit tightly enough to prevent rotation of the watering devices about the longitudinal axis of the fluid conduit.

Cleanliness of poultry raising equipment can be very important in reducing of poultry mortality rates and minimizing downgrading of birds. Dirty watering systems can foster bacteria growth and facilitate transmission of disease within a flock. Joints and crevasses in the connection brackets tend to collect dirt, and effective cleaning of the brackets can require disassembly of the entire watering system and/or use of high strength chemical cleaning agents. Either process is relatively time consuming and expensive. Further, certain commonly used chemical cleaning agents can adversely affect the watering system components.

In forming fluid tight connections and solid joints, the most well designed watering systems have employed ultrasonic welding of components. For example, nipple drinker saddles can be welded, rather than glued, to fluid conduits. ABS plastics have been most commonly used in formation of those components. However, ABS plastics are susceptible to chemical deterioration by certain cleaning agents. PVC plastics are less susceptible to such deterioration, but are far more difficult to efficiently weld together.

Other problems which can occur with the use of heavy steel pipe supports in watering systems include higher shipping and assembly costs. In an effort to provide effective watering systems with less weight, it has been suggested to attach various solid aluminum channels above the fluid conduit. One such arrangement is shown in U.S. Pat. No. 4,982,699. Unfortunately some of these aluminum channels have been found to lack sufficient rigidity and stabilization against bending in actual practice. Also, the connection brackets still must be used to join these channels to the fluid conduit, and these brackets still can collect dirt and debris during use. Special orientation and/or tightening of such brackets can be required to preclude rotation of the fluid conduit and the resulting misalignment of the connected watering devices. Such misalignment can render the watering devices inoperative and/or cause water to be spilled onto the floor of the poultry house. Further, certain channel connection arrangements commonly used are susceptible to jamming if assembled or disassembled (for repair or maintenance) in a less than completely clean environment. Again, even with aluminum channel systems there are a significant number of components to be assembled, and poultry system installation can be time consuming and a substantial expense.

Another concern in both steel pipe and aluminum channel watering systems is the prevention of poultry roosting on top of the watering system. The suspension and elevation systems for watering systems tend to be designed only to support the weight of the support pipe, the fluid conduit and the attached components. Allowing poultry to roost on the support pipes would put additional weight on the suspension system, causing the system to collapse to the floor of the poultry house. To prevent this with minimal increased expense, many different devices have been suggested to deter poultry from roosting on the support pipe. One previously effective method has been to dispose a mildly electrified wire a short distance above the support pipe. The support pipe itself acts as the electrical ground to that electrified wire, such that any bird touching both would receive a slight electrical shock.

Accordingly, it is an object of the present invention to provide improved poultry watering systems. Other objects of the present invention, individually and collectively, include:

1. minimizing production and assembly expenses of poultry watering systems,
2. reducing the weight of poultry watering systems without significant loss of strength and rigidity against bending,
3. increasing the cleanliness of poultry watering systems during use,
4. decreasing the time, expense and difficulty of cleaning poultry watering systems between flocks,
5. minimizing the detrimental affect of cleaning chemicals on poultry watering system components,
6. precluding fluid conduit rotation about its longitudinal axis during use,
7. reducing spillage from watering devices,
8. simplifying installation of watering systems,
9. increasing the operational effectiveness of watering devices employed in poultry watering systems,
10. reducing poultry mortality rates during growing, and
11. increasing the quantity and quality of poultry meat available from a given flock.

These and other objects of the present invention are attained by the provision of a poultry watering system having a support conduit integrally formed within a flange extending from and integrally formed with a fluid conduit. That flange further includes a snap-fit connection to a hanger bracket which also mounts a two-wire anti-roosting device. The fluid conduit also includes saddle flanges for retaining via snap-fit and shielding the saddles and associated drinker devices. When so retained, the saddles penetrate the fluid conduit and permit fluid flow to the drinker devices. The fluid conduit, its flanges and the support conduit can be extruded as a unitary element from PVC plastic materials while other materials can be employed for the saddle and drinker devices to minimize costs without loss of system effectiveness in performance.

Other objects, advantages and novel features of the present invention will now be readily apparent to those skilled in the art upon consideration of the detailed drawings and description below.

BRIEF DESCRIPTION OF THE DRAWINGS

FIG. 1 shows a left side view of a portion of a poultry watering system including a preferred embodiment of the present invention.

FIG. 2 is a cross-sectional view of the unitary fluid conduit/support conduit portion of the watering system of FIG. 1 taken along line 2—2 of that figure.

FIG. 3 is a cross-sectional view of the hanger bracket portion of the watering system of FIG. 1 taken along line 3—3 of that figure.

FIG. 4 is a left side view of a hanger bracket portion of the watering system of FIG. 1.

FIG. 5 is a top end view of a hanger bracket portion of the watering system of FIG. 1.

FIG. 11 is a partial cross-sectional view of the connection of the unitary fluid conduit/support conduit portions and saddle portions of the watering system of FIG. 1 taken along line 11—11 of that figure and excepting the nipple drinker portion of that construction.

DETAILED DESCRIPTION OF THE PREFERRED EMBODIMENT

Figure 10:
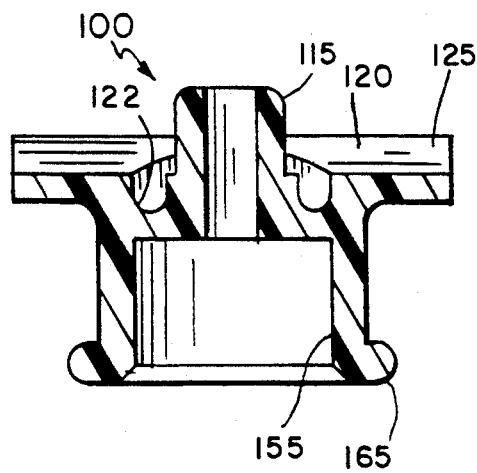
FIG. 10 is a cross-sectional view of the saddle portion of FIG. 6 taken along line 10—10 of FIG. 8 and excepting the slots for receiving a nipple drinker.

FIG. 1, which illustrates a portion of a poultry watering system incorporating a preferred embodiment of the present invention, shows a fluid pressure regulator 20 connected between a fluid supply line 25 and a fluid conduit 30. That fluid conduit distributes fluid to a plurality of watering or drinker devices 32 connected along the longitudinal length of fluid conduit 30 by a plurality of saddles 100. In each of the figures herein like numbers denote like elements.

Typical poultry houses can include enclosures of several hundred feet in length. As with prior poultry watering systems, each fluid conduit line of the poultry watering systems of the present invention can advantageously extend virtually all of the interior length of those poultry houses, with watering devices 32 preferably spaced every 8 to 12 inches along fluid conduit 30 as is conventional. Likewise as with prior poultry watering systems, depending upon the width of the enclosure and the quantity of poultry involved, several spaced-apart fluid conduit lines can advantageously extend generally parallel to each other down the length of the enclosure. Thus, it will be recognized by those skilled in the art that the view of FIG. 1 represents only a small portion of one of the fluid conduit lines of the inventive poultry watering system.

Again as with prior systems, poultry watering systems according to the present invention are typically suspended above floor 35 of the poultry enclosure during usage. Suspension wires 40 are connected to some or all of hanger brackets 50 for this purpose. Wires 40 typically extend to the ceiling of the poultry house and are connected in a conventional manner to a winching mechanism which lifts the poultry watering system to the desired heights during flock growth and, if desired, to higher levels for cleaning between flocks.

With reference to FIG. 2, fluid conduit 30 includes hanger flange or upper flange 60 having, for example, support conduit 70 included therein and spaced apart from fluid conduit 30 by flange web 65. Support conduit 70 extends, for example, parallel to fluid conduit 30 in the direction of longitudinal axis 200. Above support conduit 70, hanger flange 60 is preferably formed with retention barbs 67. In preferred embodiments, hanger flange 60 extends generally radially upward from longitudinal axis 200 of fluid channel 30.

Hanger brackets 50 are preferably formed at their lower ends with socket arms 51 and 52, having a surface configuration 53 therebetween to matingly receive that portion of hanger flange 60 having barbs 67. Arms 51 and 52 are, for example, sufficiently flexible to allow barbs 67 to be inserted therebetween. However, surface configuration 53 preferably includes inclined ledges 54 and barbs 67 preferably include complimentary ledges 68 such that once hanger flange 60 is fully inserted between arms 51 and 52 withdrawal of hanger flange 60 from hanger bracket 50 is significantly resisted.

Where it is especially important that the connection between hanger bracket 50 and hanger flange 60 be maintained once hanger flange 60 is inserted, a fastener 75, such as a rivet, screw or bolt, can be inserted through both elements, as shown in FIG. 1. The applicant anticipates such extra connection security may be desired where hanger bracket 50 is connected to wires 40. To properly locate fasteners 75, slots 55 are provided on the exterior surface of hanger bracket 50.

With reference to FIG. 3, hanger bracket 50 also includes wire retention flanges 56 and 57. These flanges are preferably disposed above arms 51 and 52 and spaced apart vertically. Flanges 56 and 57 are, for example, formed so as to flex apart from hanger bracket 50 to permit wires 80 and 85, respectively, to pass therebetween relatively easily. However, each of those flanges includes a gripping ledge 58 which thereafter significantly resists removal of those wires. Wires 80 and 85 are, for example, uncoated electrically conductive wires.

Hanger bracket 50 further includes upper passageway 59. This passageway is preferably dimensioned so as to permit wire 40 to easily pass therethrough. In preferred embodiments of the present invention it may not be necessary for every hanger bracket 50 to be connected to wire 40, depending upon the desired conventional spacing and the strength of conventional wires 40. However, to minimize the complexity of installation and the number of different parts needed in production, hanger bracket 50 has been designed to incorporate several functions.

Fluid conduit 30 is also formed with saddle flanges or lower flanges 90. Each of these flanges preferably includes a segment 92 which extends radially outward from fluid conduit 30 at an angle of approximately 30° below horizontal. At the outward end of each segment 92 a lower segment 94 is provided which extends generally downward. At the lower end of each segment 94 an inwardly extending retention ledge 96 is provided. Each such ledge 96 preferably faces the other across the bottom of fluid conduit 30. Spaced along the bottom of fluid conduit 30 approximately every 8-12 inches, as is conventional, and preferably aligned with longitudinal axis 200 are openings 31.

Saddles 100 are, for example, each formed to releasably receive a single watering device 32. In especially preferred embodiments watering devices 32 are nipple drinkers. Thus, saddles 100 preferably include an upper portion 110 for forming a fluid tight, secure connection to the lower portion of fluid conduit 30 and a lower portion 150 for forming a fluid-tight, secure connection to watering device 32.

Figure 8:
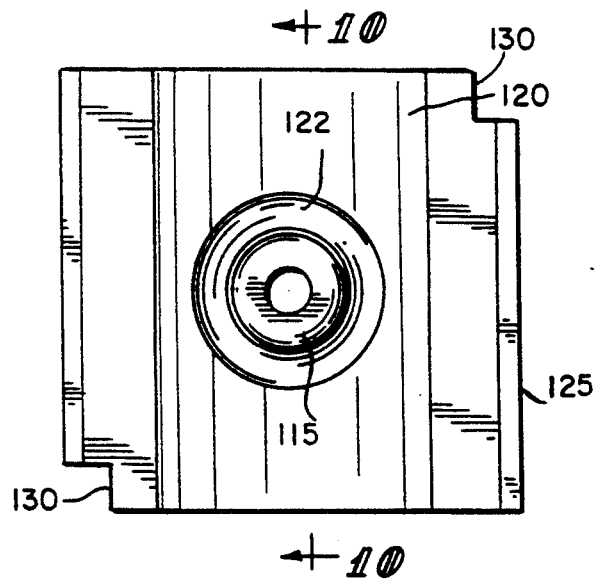
FIG. 8 is a top view of the saddle portion of FIG. 6.
Figure 6:
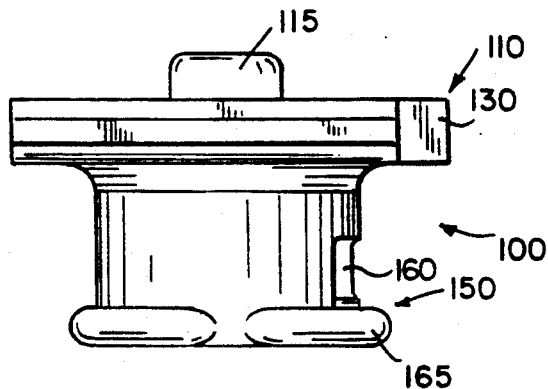
FIG. 6 is a left side view of a saddle portion of the watering system of FIG. 1.
Figure 7:
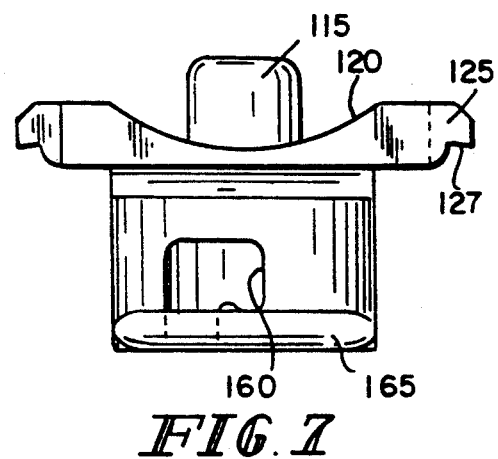
FIG. 7 is an end view of the saddle portion of FIG. 6.
Figure 9:
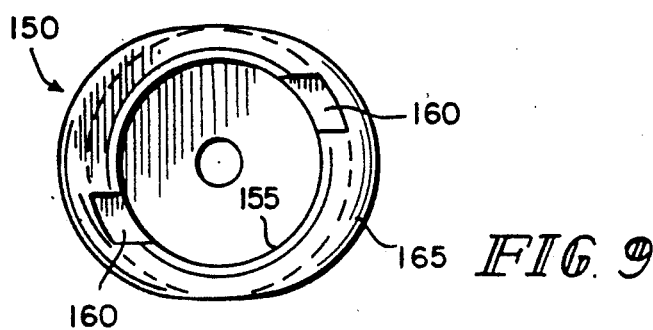
FIG. 9 is a bottom end view of the saddle portion of FIG. 6.
Figure 13:
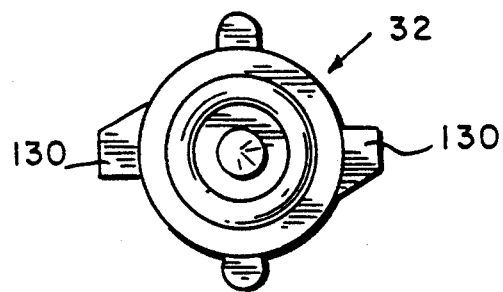
FIG. 13 is a top view of the nipple drinker of FIG. 12.
Figure 12:
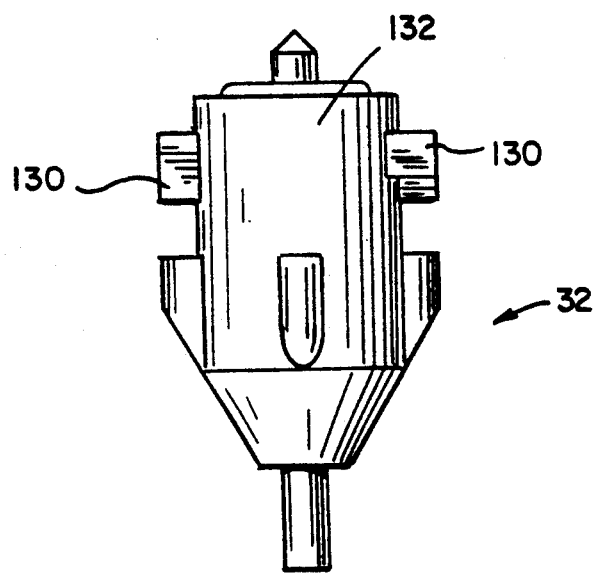
FIG. 12 is a left side view of a nipple drinker of the watering system of FIG. 1.

With reference to FIGS. 6-8, upper portion 110 includes projecting conduit 115, mating surface 120 and latching flanges 125. Projecting conduit 115 preferably extends generally vertically for a length sufficient to penetrate and project into fluid conduit 30 through opening 31. Thus, projecting conduit 115 permits fluid flow from fluid conduit 30 into the interior of saddle 100.

Mating surface 120 generally conforms to the bottom configuration or curvature of the exterior of fluid conduit 30. Mating surface 120 includes a ring shaped recess 122 therein about projecting conduit 115. A sealing O-ring 124 is preferably disposed within recess 122 to prevent leakage from the penetration of projecting conduit 115 into fluid conduit 30.

Latching flanges 125 extend outwardly from mating surface 120 and are adapted to engage saddle flanges 90 between each lower segment 94 and rest on each retention ledge 96. Mating ledges 127 are formed at the end of each of latching flanges 125 in a configuration complimentary to that of retention ledges 96 so as to resist removal of saddle 100 once inserted between saddle flanges 90. Notches 130 are preferably formed in opposing corners of latching flanges 125 to permit alternate use of saddles 100 in different watering system constructions wherein saddle flanges include projections to preclude sliding along the longitudinal length of fluid conduit 30.

Lower portion 150 may be of several alternative configurations depending upon the specific watering device to be utilized. In especially preferred embodiments, a nipple drinker of the type shown in co-pending U.S. patent application Ser. No. 07/648,400 would be employed. This drinker is currently being marketed by Ziggity Systems, Inc. of Middlebury, Ind. under drinker model names "Big Ace" or "1300". Thus, lower portion 150 would include chamber 155 into which upper body 132 of watering device 32 is inserted, slots 160 to receive locking projections 130 of watering device 32, and reinforcing ring 165. Since these features have been shown in detail in the above-referenced patent application, the disclosure therein is hereby specifically incorporated by reference in the present application. Various other nipple and cup drinkers can be employed as desired, but preferred embodiments would include nipple drinkers having the internal function and operation of the nipple drinker shown and described in co-pending U.S. patent application Ser. No. 07/580,443. Such devices are also currently marketed by Ziggity Systems, Inc. under the model name "1025" drinker.

It has been found to be especially advantageous to extrude fluid channel 30, hanger flange 60, support conduit 70 and saddle flanges 90 all into a single, integral piece of conventional length, such as 8 feet. To assemble a watering system of any desired length, connection tube 140 is inserted into corresponding ends of support channel 70 and conduit tube 145 is inserted over corresponding ends of fluid conduit 30 after interfering portions of web 65 and saddle flanges 90 are cut away. Conduit tube 145 preferably includes conventional fluid sealing means therein so that no leakage occurs at the connection.

It has also been found to be especially advantageous to form the extruded unitary fluid channel/support channel element from PVC plastic materials, such as "R.P.V.C." white plastic sold commercially by Omega Plastics Corp. of Elkhart, Ind. Hanger bracket 50 is also preferably formed from similar PVC plastics, but watering device 32 is preferably formed from weldable ABS plastics, and saddle 100 is preferably formed from polypropylene plastics.

In operation, hanger flange 60, especially with a hollow channel serving as support channel 70, provides rigidity and strength to fluid conduit 30 to prevent bending. Support channel 70 can be of various cross-sectional shapes and need not be hollow, but it has been found to be generally advantageous to avoid formation of angular protrusions on hanger flange 60 which tend to trap or retain direct and debris. During use, sufficient weight is provided for watering system stability or ballast by dimensioning fluid channel 30 with a 1-inch diameter, twice the usual size, since the extra volume of water would provide the needed weight. If the watering system is to be raised toward the poultry house ceiling to facilitate floor cleaning between flocks, that water can be drained and the watering system made substantially lighter. Using a larger than normal fluid conduit in this manner provides the additional benefit of improving performance of the watering device by permitting the pressure regulator 20 to supply a greater volume of water at a lower pressure to each watering device.

Also, the structure of the present invention permits optimum utilization of materials and reduced production costs. After each flock of poultry is fully grown and removed from the poultry house, growers often wash down the poultry enclosure with chemical cleaning fluids. If the hanger bracket and unitary fluid channel/support channel elements are formed from PVC plastics they will not be adversely affected by these cleaning fluids. The saddles and watering devices, preferably formed from polypropylene and A.B.S. plastics, respectively, could be adversely affected by those cleaning fluids, but the saddle flanges effectively shield the saddles and watering devices from run off and spray over watering system. Saddle flanges 90 also serve to strengthen fluid conduit 30 against bending, particularly where saddle flanges 90 include a longitudinally extending angle or bend, such as, for example, at the junction of segments 92 and 94.

Roosting of poultry on the watering system is effectively prevented by connecting one of wires 80 and 85 (preferably wire 85) to a electrical voltage supply in a conventional manner and connecting the other of wires 80 and 85 (preferably wire 80) to an electrical ground. Thus, the function of prior electrified anti-roosting systems can be achieved without significant weight from steel pipe. In those applications where non-electrified wires have been effective to prevent roosting, the present invention can be employed with only one of wires 80 and 85. Further, wires 80 and 85 can be drawn taut along the length of the watering system to assist connecting elements 140 and 145 in retaining watering system segments.

Production, installation, repair and maintenance of watering systems of the present invention is simplified not just because of the decreased weight, but also because fewer connection components are needed. Those connections that are used are formed to be snap-fit into place due to the structure shown and the flexibility of the preferred materials. Further, since the fluid channel and support channel are formed in a unitary structure, rocking or rotation of the fluid channel about longitudinal axis 200, as could otherwise have been caused by lateral forces exerted on the watering devices, is substantially avoided. Having fewer connections also minimizes the accumulation of dirt and debris on the watering system and simplifies cleaning of the components.

Although the present invention has been described above in detail, the same is by way of illustration and example only. Those skilled in the art will now recognize that various modications can be made to produce other embodiments of the present invention. Accordingly, the spirit and scope of this invention are limited only by the terms of the following claims.

What is claimed is:

1. A poultry watering system, suspended along its longitudinal length above the floor of an enclosure for raising poultry, comprising:
   a fluid conduit extending longitudinally with said poultry watering system,
   said fluid conduit including at least one integrally formed flange extending generally radially outward from said fluid conduit,
   said flange including therein integrally formed strengthening means for resisting bending of said fluid conduit,
   said strengthening means comprising a longitudinal extending tubular element, and
   connection means attached to said flange for joining said flange with a means for suspending said fluid conduit above said floor.

2. The poultry watering system according to claim 1 wherein said fluid conduit includes at least one second integrally formed flange extending generally outward from said fluid conduit.

3. The poultry watering system according to claim 2 wherein said second flange includes retaining means for engaging and holding at least one watering device in fluid communication with said fluid channel.

4. The poultry watering system according to claim 3 wherein said at least one integrally formed flange also includes second strengthening means for resisting bending of said fluid conduit.

5. The poultry watering system according to claim 3 wherein said second flange is formed and disposed with respect to said fluid channel and said watering device such that said second flange shields said watering device against fluid run off from said fluid conduit.

6. The poultry watering system according to claim 1 wherein a plurality of longitudinally aligned openings are disposed in said fluid conduit and a second and third flange are included on said fluid conduit, one each on opposite sides of said aligned openings, said second and third flanges of said fluid conduit being formed with means for receiving and holding a plurality of watering devices each of which are partially insertable into one of said aligned openings.

7. The poultry watering system according to claim 1 wherein said strengthening means includes an integrally formed second conduit separated from said fluid conduit and extending parallel with said fluid conduit in the longitudinal direction of said fluid conduit.

8. The poultry watering system according to claim 1 wherein a plurality of said fluid conduits are longitudinally connected to substantially form the longitudinal length of said poultry watering system.

9. The poultry watering system according to claim 1 wherein said connection means includes means for retaining two spaced-apart electrically conductive wires extending generally parallel with said fluid conduit in the longitudinal direction of said fluid conduit.

10. A poultry watering system, for use in an enclosure for retaining poultry, comprising:
    a fluid conduit,
    a plurality of watering devices,
    saddle means for releasably retaining each of said watering devices,
    a support conduit,
    first means for preventing poultry from roosting on said poultry watering system,
    second means for suspending said poultry watering system above the floor of said enclosure,
    said fluid conduit and said support conduit including at least one integrally formed flange connecting those two components,
    said support conduit including an integrally formed second flange and said first means and said second means being incorporated in a bracket element connected to said second flange,
    said saddle means including conduit means for providing fluid communication between said fluid conduit and each of said watering devices,
    said fluid conduit including third and fourth flanges for engaging said saddle means, and
    said first means including two spaced apart electrically conductive wires extending above said fluid conduit.

11. A poultry watering system, for suspension above the floor of an enclosure for poultry, comprising:
    at least one unitary fluid conduit and support conduit element having a hanger flange and at least one saddle flange,
    hanger means, attached to said hanger flange, for connecting said unitary fluid conduit and support conduit element to an apparatus for suspending said poultry watering system, and
    at least one saddle element, attached to said saddle flange, for securing watering devices to a fluid conduit portion of said unitary fluid conduit and support conduit element.

12. The poultry watering system according to claim 11 wherein said hanger means includes elements for receiving at least two electrically conductive wires spaced apart from each other and above said unitary fluid conduit and support conduit element.

13. The poultry watering system according to claim 11 wherein said saddle flange is disposed so as to shield said saddle element from exposure to fluids running off of said unitary fluid conduit and support conduit element.

* * * * *